United States Patent [19]

Picone

[11] 4,233,075

[45] Nov. 11, 1980

[54] PRESERVATIVE SOLUTION FOR MATERIAL SHINING CLOTH

[76] Inventor: Stephano Picone, 1727 Riverside Dr., Dearborn, Mich. 48120

[21] Appl. No.: 57,388

[22] Filed: Jul. 13, 1979

[51] Int. Cl.³ .............................................. C09D 3/00
[52] U.S. Cl. ........................................... 106/3; 106/4; 106/5
[58] Field of Search ................. 106/3, 4, 5; 426/266, 426/267, 268, 269, 270

[56] References Cited

U.S. PATENT DOCUMENTS

| | | | |
|---|---|---|---|
| 2,589,037 | 3/1952 | Bendix et al. | 426/267 |
| 2,780,551 | 2/1957 | Guadagni | 426/268 |
| 2,906,628 | 9/1959 | Malecki | 426/270 |
| 2,944,903 | 7/1960 | Chemicek | 426/267 |
| 2,976,157 | 3/1961 | Malecki | 426/270 |
| 2,987,401 | 6/1961 | Johnston et al. | 46/267 |
| 2,989,403 | 6/1961 | Malecki | 426/267 |

*Primary Examiner*—Hosea E. Taylor
*Assistant Examiner*—Amelia B. Yarbrough
*Attorney, Agent, or Firm*—Robert G. Mentag

[57] ABSTRACT

A food base preservative for material surfaces such as finished furniture surfaces, painted surfaces, glass surfaces, vinyl plastic surfaces, and the like. The preservative solution is made from okra, water and a food preservative agent, and it is used by impregnating soft cloths, such as towels, with the solution and shining material surfaces with the impregnated cloths.

2 Claims, No Drawings

PRESERVATIVE SOLUTION FOR MATERIAL SHINING CLOTH

BACKGROUND OF THE INVENTION

This invention relates to preservative solutions for surfaces of various materials, such as finished wood surfaces, vinyl plastic, chrome, formica, and other materials. The invention is specifically concerned with a vegetable base preservative solution, and a material surface shining cloth impregnated with the preservative solution of the invention.

SUMMARY OF THE INVENTION

In accordance with the present invention, the preservative solution comprises a syrupy type solution made by boiling a predetermined amount of okra in a predetermined amount of water. An anti-oxidant is added to the water and okra, and the aforegoing mixture is heated for a predetermined time, after which it is allowed to age for at least one month at room temperature. The preservative solution is then heated and used to impregnate towels or other material, preferably a soft cloth, as for example, a towel having terry cloth on one side and a smooth surface on the other side. The towels are immersed in the heated preservative solution, and the solution is brought to a boiling point for a predetermined time period. The towels are then removed, and the excess solution drained therefrom, and then they are dried by any suitable means, as by a gas dryer. The towels are next ironed, as by hand, and they are then ready for use for shining furniture surfaces, and the like.

The application of the preservative solution on the surface of a material, as for example, on the surfaces of finished furniture, paint, chrome or the like, applies a hard original shine in the form of a hard preservative coating having a vegetable base.

DESCRIPTION OF THE PREFERRED EMBODIMENT

The preservative solution of the present invention is a vegetable base preservative since it is made from the vegetable okra. Okra is available in super markets and other stores, and the nutrition information of okra is normally printed on the bag in which the okra is sold. For example, okra may be sold in a container having five servings of 3.2 ounces each. The nutrition information for each such serving size contains the following:

| | |
|---|---|
| protein | 2 grams |
| Vitamin A | 10 grams |
| Vitamin C | 25 grams |
| Thiamine | 8 grams |
| Iron | 2 grams |
| Niacin | 4 grams |
| Riboflavin | 8 grams |
| Calcium | 8 grams |
| Carbohydrate | 7 grams |
| Magnesium | 0 grams |
| Fat | 0 grams |
| Calories | 35 grams |

The preservative solution of the present invention is made in accordance with the following formula. Sixteen ounces of okra is mixed in a volume of water, which volume may range from 3½ to 4½ gallons. An anti-oxidant is added to the combination of water and okra in an amount selected from the range of 2 tablespoons to 3½ tablespoons. The okra mixture is boiled for approximately one hour and forty-five minutes, until the okra seeds have turned brown, and the liquid becomes syrupy.

After the okra, water and the anti-oxidant have been heated for an hour and forty-five minutes, the preservative solution is left to cool at room temperature, and it is aged at room temperature for at least one month. The preservative solution is then heated up to the boiling point, and towels made from soft material are immersed in the preservative solution for a time period of 20 to 25 minutes to impregnate the towels with the preservative solution. During the towel impregnation period, the preservative solution is retained at the boiling point, after which it is left to cool to room temperature.

After the preservative solution with the towels in it has cooled to room temperature, the towels are removed, and they are disposed so as to drain excess solution off the same, after which the towels are dried, either naturally or with a dryer, such as a gas dryer. After the towels have been dried they are ironed, and they are then ready for use.

Any anti-oxidant available on the market for use as an antibrowning agent for fruits and vegetables may be used, or any suitable food preservative. For example, an anti-oxidant of this type is available on the market from McCormick & Company, Inc. of Baltimore, Maryland 21202, and the ingredients are: Sodium Bisulfite, Citric Acid, Sodium Bicarbonate, Vegetable Oil, Silicon Dioxide and Ascorbic Acid. The towels may be made from any suitable soft cloth material, as for example, towels which are smooth on one side and have a terry cloth finish on the other side.

A towel impregnated with the preservative solution of the present invention is not a dusting cloth. If a material surface is to be treated with a preservative towel made in accordance with the present invention, then such surface should first be dusted or cleaned, and if dull, it should be first polished. The preservative towel made in accordance with the present invention is then applied on the material surface and it applies some of the preservative solution in the towel onto the surface of the material to impart a very hard shine to the surface of the material. It has been found that a shining cloth made in accordance with the present invention may be employed to apply a shine to various materials, such as polished furniture, painted surfaces, chrome, vinyl plastic, formica, wood, porcelain, auto paint finish, lacquer, paints, glass surfaces such as TV glass screens and surfaces, delicate metal instrument surfaces, such as silverware, jewelry, metal ware and the like. The preservative solution may also be used in washing porcelain or plastic dishes by adding 3 to 4 ounces mixed with any liquid or granular dish washing soap. The solution provides a shiny and protective coating to the dishes. The application of a preservative cloth on a material surface brings color back to the device to which it is applied and makes for a rich, shiny look.

The preservative solution of the present invention is not injurious to any of the aforementioned material surfaces to which it may be applied, because it is made from harmless food elements having nutritional value. The anti-oxidant agent or preservative agent prevents fermentation.

While it will be apparent that the preferred embodiment of the invention herein disclosed is well calculated to achieve the results aforestated, it will be appreciated that the invention is susceptible to modification, variation and change.

What I claim is:

1. A method for making a vegetable base preservative solution and its addition to material surfaces, comprising the steps of:
    (a) providing a volume of water selected from the range of 3½ gallons to 4½ gallons;
    (b) mixing 16 ounces of okra in said volume of water;
    (c) adding a food preservative agent to the mixture of water and okra in an amount selected from the range of 2 tablespoons to 3½ tablespoons;
    (d) boiling the mixture of water, okra and food preservative agent for about one hour and forty-five minutes to make a syrupy solution; and,
    (e) cooling and ageing the solution for at least one month,
    (f) bringing the solution to boiling and adding towels made of soft material,
    (g) immersing towels in said solution for 20-25 minutes,
    (h) cooling towel mixture,
    (i) draining off excess solution and drying.

2. A material surface shining cloth which is impregnated with a vegetable base preservative solution made from a boiled mixture of okra, water and a food preservative agent.

* * * * *